US009543649B2

(12) United States Patent
Bard et al.

(10) Patent No.: US 9,543,649 B2
(45) Date of Patent: *Jan. 10, 2017

(54) CONFIGURABLE SEGMENTED ANTENNA

(71) Applicant: AT&T Mobility II LLC, Atlanta, GA (US)

(72) Inventors: Thomas Bard, Alpharetta, GA (US); George Creigh, Acworth, GA (US); Roger Mahn, Roswell, GA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/162,139

(22) Filed: May 23, 2016

(65) Prior Publication Data

US 2016/0268679 A1 Sep. 15, 2016

Related U.S. Application Data

(63) Continuation of application No. 14/802,155, filed on Jul. 17, 2015, now Pat. No. 9,373,887, which is a continuation of application No. 12/957,687, filed on Dec. 1, 2010, now Pat. No. 9,118,416.

(51) Int. Cl.
*G06F 3/033* (2013.01)
*H01Q 3/24* (2006.01)
*H04B 17/18* (2015.01)

(52) U.S. Cl.
CPC .............. *H01Q 3/247* (2013.01); *H04B 17/18* (2015.01)

(58) Field of Classification Search
CPC ........ H01Q 3/26; H01Q 3/2605; H01Q 1/246; H01Q 21/22; H01Q 3/267; H01Q 3/2611; H01Q 3/28; H01Q 21/0025; H01Q 25/00; H01Q 3/2682; H01Q 3/30; H01Q 21/061; H01Q 3/24; H01Q 3/34; H01Q 21/08; H01Q 3/22; H01Q 3/38; H01Q 3/44
USPC ........................................................ 343/377
See application file for complete search history.

(56) References Cited

U.S. PATENT DOCUMENTS

| 6,140,967 | A | 10/2000 | Kolsrud | |
|---|---|---|---|---|
| 6,333,722 | B1 * | 12/2001 | Kitano | H01Q 1/362 343/895 |
| 7,420,521 | B2 | 9/2008 | Hauck | |
| 7,937,124 | B2 * | 5/2011 | Chung | H04B 1/3838 343/846 |

(Continued)

OTHER PUBLICATIONS

Office Action dated May 10, 2013 for U.S. Appl. No. 12/957,687, 19 pages.

(Continued)

*Primary Examiner* — Ajibola Akinyemi
(74) *Attorney, Agent, or Firm* — Amin, Turocy & Watson, LLP

(57) ABSTRACT

A configurable segmented antenna is described herein. A monitor component can be configured to detect at least one parameter corresponding to one or more segments of an antenna integrated with a communications device. An antenna component can be configured to select at least one segment of the one or more segments in response to the at least one parameter. A control component can be configured to modify a quality of a signal according to the at least one parameter. Further, a transmission component can be configured to transmit the signal from the at least one segment based on the quality.

20 Claims, 11 Drawing Sheets

(56) References Cited

U.S. PATENT DOCUMENTS

| | | | |
|---|---|---|---|
| 2007/0188390 A1* | 8/2007 | Dunn | H04B 7/0602 |
| | | | 343/702 |
| 2008/0111748 A1 | 5/2008 | Dunn et al. | |
| 2008/0300009 A1* | 12/2008 | Quinn | H01Q 1/2258 |
| | | | 455/553.1 |
| 2009/0102733 A1 | 4/2009 | Kanne et al. | |
| 2010/0197309 A1 | 8/2010 | Fang et al. | |
| 2010/0231473 A1 | 9/2010 | Shtrom et al. | |
| 2011/0187507 A1* | 8/2011 | Nikitin | G06K 19/0723 |
| | | | 340/10.1 |
| 2011/0250928 A1 | 10/2011 | Schlub et al. | |
| 2012/0112970 A1* | 5/2012 | Caballero | H01Q 1/243 |
| | | | 343/702 |

OTHER PUBLICATIONS

Office Action dated Oct. 21, 2013 for U.S. Appl. No. 12/957,687, 14 pages.
Office Action dated Jan. 27, 2014 for U.S. Appl. No. 12/957,687, 14 pages.
Office Action dated Jun. 13, 2014 for U.S. Appl. No. 12/957,687, 15 pages.
Office Action dated Oct. 17, 2014 for U.S. Appl. No. 12/957,687, 16 pages.
Notice of Allowance dated Feb. 24, 2016 for U.S. Appl. No. 14/802,155, 28 pages.

* cited by examiner

CONFIGURABLE SEGMENTED ANTENNA

CROSS-REFERENCE TO RELATED APPLICATION

This patent application is a continuation of, and claims priority to, U.S. patent application Ser. No. 14/802,155, filed on Jul. 17, 2015, and entitled "CONFIGURABLE SEGMENTED ANTENNA," which is a continuation of, and claims priority to U.S. patent application Ser. No. 12/957,687, filed on Dec. 1, 2010, (now U.S. Pat. No. 9,118,416, issued on Aug. 25, 2015) and entitled "CONFIGURABLE SEGMENTED ANTENNA." The entireties of the aforementioned applications are hereby incorporated by reference herein.

TECHNICAL FIELD

This disclosure relates generally to antenna technologies for communication devices.

BACKGROUND

Conventional antenna technologies enable a communication device to transmit and/or receive electromagnetic radiation via antenna(s); however, such technologies reduce communication device performance if an orientation of the antenna(s) changes, and/or if one or more parts of the antenna(s) are obstructed.

The above-described deficiencies of today's antenna and related technologies are merely intended to provide an overview of some of the problems of conventional technology, and are not intended to be exhaustive. Other problems with the state of the art, and corresponding benefits of some of the various non-limiting embodiments described herein, may become further apparent upon review of the following detailed description.

The following description and the annexed drawings set forth in detail certain illustrative aspects of the disclosed subject matter. These aspects are indicative, however, of but a few of the various ways in which the principles of the various embodiments may be employed. The disclosed subject matter is intended to include all such aspects and their equivalents. Other aspects of the disclosed subject matter will become apparent from the following detailed description of the various embodiments when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
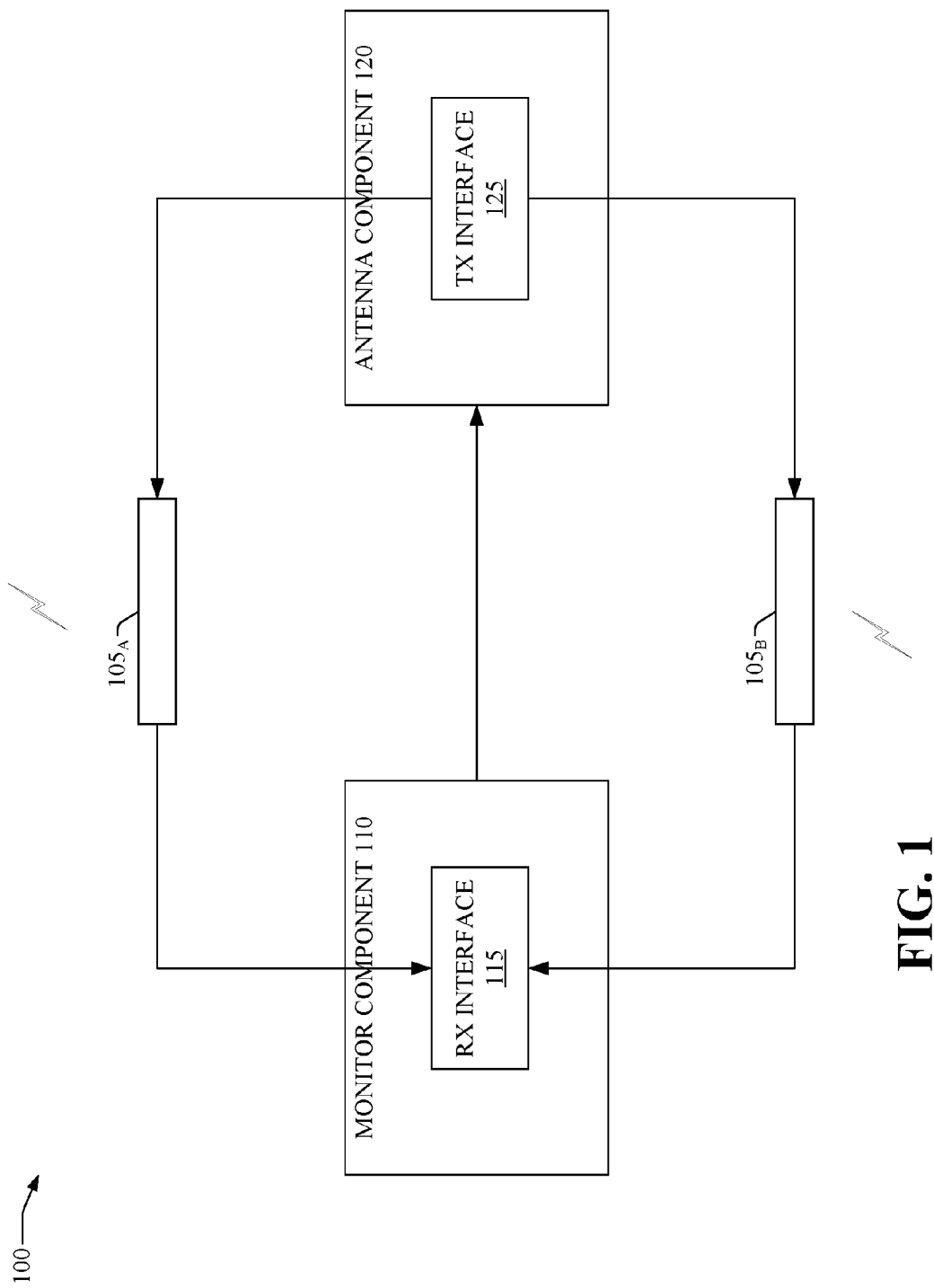
FIG. 1 illustrates a communications device utilizing a configurable segmented antenna, in accordance with an embodiment.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Conventionally, changes in orientation of antenna(s) of a communication device reduce performance of the communication device, e.g., when the communications device is moved to/from a pocket. Further, communication device performance is reduced if one or more parts of the antenna(s) are obstructed by an object, e.g., a hand, a building, etc.

To correct for these and/or other drawbacks of conventional antenna technologies, various systems, methods, and apparatus described herein configure segment(s) of an antenna integrated with a communications device. For example, a method can measure, by the communications device, one or more parameters corresponding to one or more segments of the antenna. Further, the method can select, by the communications device, a segment of the one or more segments according to the one or more parameters.

In another example, the method can receive, by the communications device, a signal via a segment of the one or more segments. Further, the method can measure a parameter, e.g., a power, a magnitude, etc. of the signal, and select the segment in response to the parameter.

In yet another example, the method can select, in response to the one or more parameters, a first segment of the antenna associated with a wireless protocol and a second segment of the antenna associated with the wireless protocol. In another example, the method can select, in response to the one or more parameters, a first segment of the antenna associated with a first wireless protocol and a second segment of the antenna associated with a second wireless protocol.

In one example, the method can vary, via the segment, a quality of a signal in response to the one or more parameters. Further, the method can transmit the signal from the segment in response to the varying the quality. In yet another example, the method can vary, via the segment, a power of the signal, a magnitude of the signal, and/or a direction of propagation of the signal in response to the one or more parameters.

In another example, an apparatus can include a monitor component configured to detect at least one parameter, e.g., a power of a signal, a magnitude of the signal, etc. corresponding to one or more segments of an antenna integrated with a communications device. Further, the apparatus can include an antenna component configured to select at least one segment of the one or more segments in response to the at least one parameter.

In yet another example, the antenna component can further include a control component configured to modify a quality of a signal according to the at least one parameter. Further, the antenna component can include a transmission component configured to transmit the signal from the at least one segment based on the quality. In one example, the control component can modify a power of the signal, a magnitude of the signal, and/or a direction of propagation of the signal based on the at least one parameter. Further, the transmission component can transmit the signal from the at least one segment based on the power of the signal, the magnitude of the signal, and/or the direction of propagation of the signal.

In one example, the monitor component can be configured to detect an obstruction of a segment of the one or more segments. Furthermore, the antenna component can be configured to select the at least one segment in response to the obstruction. In another example, the antenna component can be configured to decrease a first use of the segment and/or increase a second use of the at least one segment in response to the obstruction. In yet another example, the antenna component can be configured to (1) modify, via the segment, a power of a first signal, a magnitude of the first signal, and/or a direction of propagation of the first signal in response to the obstruction; and/or (2) modify, via the at least one segment, a power of a second signal, a magnitude of the second signal, or a direction of propagation of the second signal in response to the obstruction.

In another example, the monitor component can include a sensing component configured to detect the obstruction of the segment in response to at least one of a touch of the antenna, a touch of an object coupled to the antenna, a source of heat applied to the antenna, or a source of heat applied to the object.

In yet another example, at least a part of a segment of the one or more segments of the antenna can extend from the communications device, be enclosed by the communications device, be included in a surface of the communications device, be included on a surface of the communications device, and/or be included in an overlapping strip of one or more overlapping strips of the one or more segments.

In one example, a system can include means for determining whether a first segment of one or more segments of an antenna integrated with a communications device is obstructed; and means for optimizing selection of at least one segment of the one or more segments if the first segment is obstructed. In one example, the means for optimizing selection of the at least one segment can further include means for (1) increasing a power of a signal and/or a strength of the signal; and/or (2) selecting the at least one segment in response to a direction of propagation of the signal via the at least one segment. Further, the means for optimizing the selection of the at least one segment can include means for transmitting the signal according to the power of the signal, the strength of the signal, and/or the direction of propagation of the signal.

Aspects, features, and/or advantages of the disclosed subject matter can be exploited in substantially any wireless telecommunication or radio technology, e.g., wireless fidelity (Wi-Fi™); Bluetooth™, Worldwide Interoperability for Microwave Access (WiMAX™); Enhanced General Packet Radio Service (Enhanced GPRS); Third Generation Partnership Project (3GPP) Long Term Evolution (LTE™); Third Generation Partnership Project 2 (3GPP2); Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); LTE™ Advanced (LTE-A), Global System for Mobile Communication (GSM), Near Field Communication (NFC), Wibree, Wi-Fi Direct™ etc.

Additionally, one or more embodiments described herein can include legacy telecommunication technologies, e.g., plain old telephone service (POTS). Further, selections of a radio technology can include second generation (2G), third generation (3G), and fourth generation (4G) evolution of the radio technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, such as a mobile wireless device, e.g., user equipment (UE), and/or within one or more elements of a network infrastructure, e.g., radio network controller, wireless access point (AP), etc.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "platform," "node," "layer," "selector," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via optimization component (described below), to automatically evaluate each segment of one or more segments of an antenna integrated with a communications device, based on, e.g., a received signal strength indicator (RSSI) of an associated communication protocol. Further, the artificial intelligence system can be used, via the optimization component, to automatically select segment(s) of the one or more segments for wireless communication(s) via the communications device in response to the RSSI of signal(s) of respective segment(s) of the one or more segments.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD)); smart card(s); and flash memory device(s) (e.g., card, stick, key drive); and/or a virtual device that emulates a storage device and/or any of the above computer-readable media.

Moreover, terms like "user equipment," (UE) "mobile station," "mobile subscriber station," "access terminal," "terminal", "handset," "appliance," "machine," "wireless communication device," "cellular phone," "personal digital assistant," "smartphone," and similar terminology refer to a wireless device at least one of (1) utilized by a subscriber or user of a wireless communication service to receive and/or convey data associated with voice, video, sound, and/or substantially any data-stream or signaling-stream; or (2) utilized by a subscriber of a voice over internet protocol (VOIP) service that delivers voice communications over internet protocol (IP) networks such as the Internet or other packet-switched networks. Further, the foregoing terms are utilized interchangeably in the subject specification and related drawings.

Furthermore, the terms "user," "subscriber," "customer," "consumer," "agent," "owner," and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formalisms, which can provide simulated vision, sound recognition, decision making, etc.

Also, the terms "local wireless communications cite," "access point," "base station," and the like are utilized interchangeably throughout the subject specification, and refer to devices that can receive and transmit signal(s) from and to wireless devices through one or more antennas. In addition, the terms "wireless network" and "network" are used interchangeable in the subject application, unless context warrants particular distinction(s) among the terms.

The subject disclosure relates to systems, methods, and apparatus associated with configuring segment(s) of an antenna integrated with a communications device. As described above, conventional antenna techniques reduce performance of a device if an orientation of antenna(s) of the device changes, and/or if one or more parts of the antenna(s) are obstructed. Compared to such techniques, various systems, methods, and apparatus described herein facilitate improved performance of a communications device by configuring segment(s) of a segmented antenna of the communications device in response to measured parameters.

Aspects of systems, apparatus, and processes explained herein can constitute machine-executable instructions embodied within a machine, e.g., embodied in a computer readable medium associated with the machine. Such instructions, when executed by the machine, can cause the machine to perform the operations described. Additionally, the systems and processes can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Now referring to FIG. 1, a communications device 100 is illustrated, in accordance with an embodiment. Communications device 100, e.g., wired device, wireless device, cellular phone, personal data assistant (PDA), mobile phone, wireless access point, picture frame, etc. can include segments $105_A$ and $105_B$ of a segmented antenna integrated with communications device 100, a monitor component 110, and an antenna component 120. Monitor component 110 can be configured to detect at least one parameter corresponding to segments $105_A$ and $105_B$, respectively. In an aspect, monitor component can include a receiver (RX) interface 115, which can include components, hardware, devices, etc. configured to determine signal strength and/or signal power associated with signals(s) detected via one or more receivers and/or transceivers (not shown) communicatively coupled to antenna segments $105_A$ and $105_B$.

In an aspect, the one or more segments, e.g., antenna segments $105_A$ and $105_B$, etc. can be associated with a common wireless protocol, or with different wireless protocols. For example, the one or more segments can be associated with at least one of: a wireless fidelity (Wi-Fi™) protocol; a Worldwide Interoperability for Microwave Access (WiMAX™) protocol; a Bluetooth™ protocol; an Enhanced General Packet Radio Service (Enhanced GPRS) protocol; a Third Generation Partnership Project (3GPP) protocol; a Long Term Evolution (LTE™) protocol; a Third Generation Partnership Project 2 (3GPP2) protocol; an Ultra Mobile Broadband (UMB) protocol; a 3GPP Universal Mobile Telecommunication System (UMTS) protocol; a High Speed Packet Access (HSPA) protocol; a High Speed Downlink Packet Access (HSDPA) protocol; a High Speed Uplink Packet Access (HSUPA) protocol; an LTE™ Advanced (LTE-A) protocol; a Global System for Mobile Communication (GSM) protocol, a Near Field Communication (NFC) protocol, a Wibree protocol, or a Wi-Fi Direct™ protocol.

Figure 2:
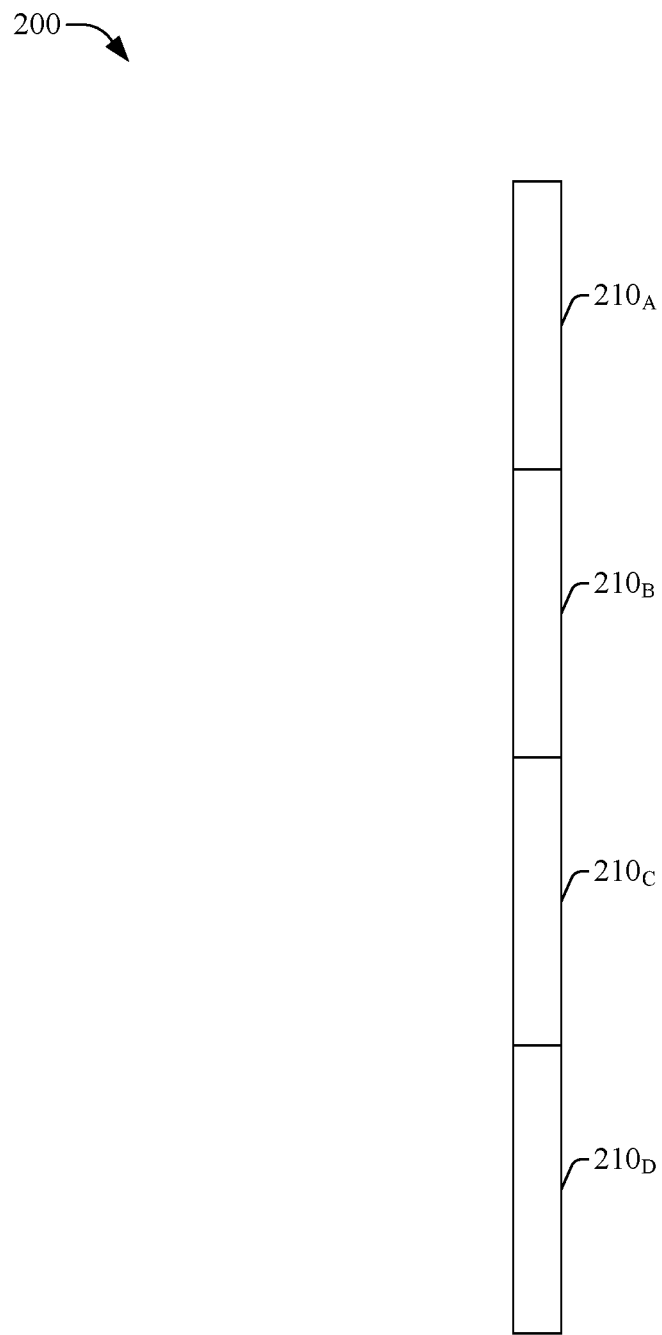
FIG. 2 illustrates a segmented antenna, in accordance with an embodiment.

In one aspect, at least a part of a segment of the one or more segments of the antenna can extend from communications device 100; be enclosed by communications device 100; be included in a surface of communications device 100; be included on a surface of communications device 100; and/or be included in an overlapping strip of one or more overlapping strips of the one or more segments. In an aspect illustrated by FIG. 2, the antenna can include segments $210_A$, $210_B$, $210_C$, and $210_D$ that can be arranged in an end-to-end configuration. It should be appreciated that although FIG. 2 illustrates the one or more segments aligned in one direction, the one or more segments can be arranged in an end-to-end configuration aligned in different directions.

Figure 3:
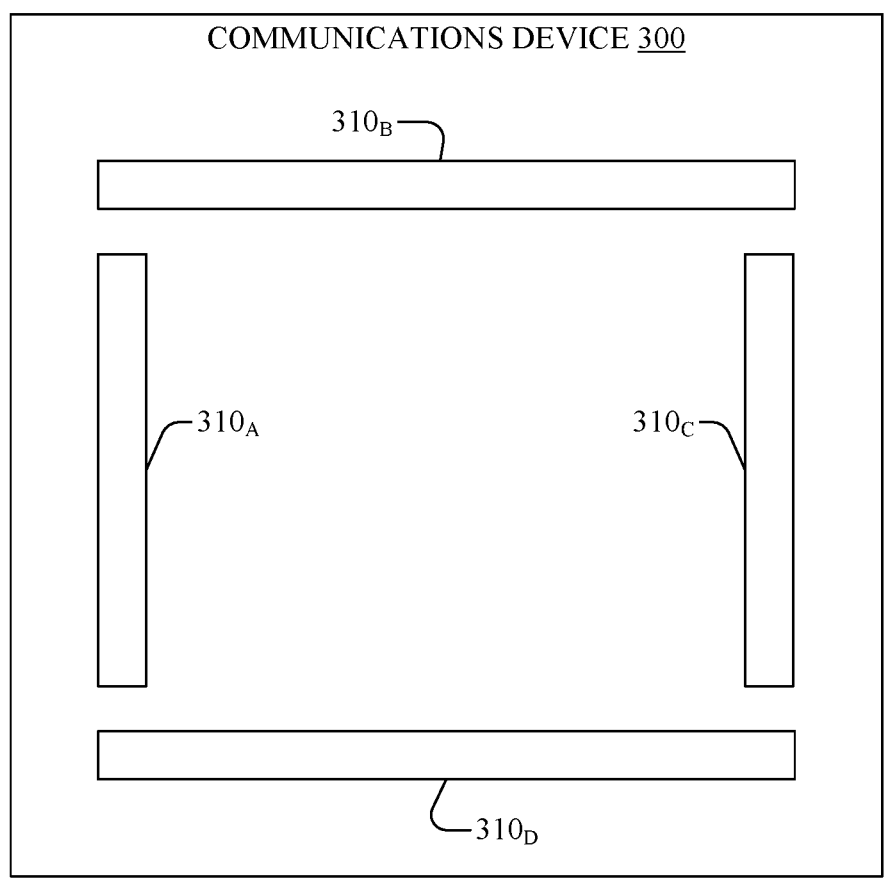
FIG. 3 illustrates another communications device utilizing a configurable segmented antenna, according to an embodiment.
Figure 4:
FIG. 4 illustrates another segmented antenna, in accordance with an embodiment.

In another aspect illustrated by FIG. 3, the antenna can include segments $310_A$, $310_B$, $310_C$, and $310_D$ aligned with, and/or included, in one or more external surfaces of communications device 300. It should be appreciated that although FIG. 3 illustrates a segment of the one or more segments separated from other segments of the one or more segments, such segments can be contiguously aligned, e.g., adjoined at ends, around a surface of communications device 300. In yet another aspect illustrated by FIG. 4, the antenna can include segments $410_A$, $410_B$, $410_C$, and $410_D$ arranged in overlapping strips. It should be appreciated that although FIG. 4 illustrates a segment of the one or more segments directly adjoined to another segment, such segments can be separated, e.g., via an air gap, via one or more materials, etc.

Referring now to FIG. 1, antenna component 120 can be configured to select at least one segment of the one or more segments in response to the at least one parameter. For example, and referring to FIG. 3, monitor component 110 can detect a power level of one or more signals received via respective segments $310_A$, $310_B$, $310_C$, and $310_D$ of communications device 300. If an orientation of communications device 300 changes, and/or at least one segment of segments $310_A$, $310_B$, $310_C$, and $310_D$ are obstructed, one or more segments of segments $310_A$, $310_B$, $310_C$, and $310_D$ can experience reduced signal transmission and/or reduced signal reception power levels. Accordingly, monitor component 110 can detect lower power levels of signals received via the one or more segments, e.g., in response to movement of communications device 300. As such, antenna component 120 can facilitate improved performance of communications device 300 by selecting, or utilizing, other segment(s), e.g., to transmit and/or receive wireless transmissions via communications device 300. For example, antenna component 120 can include a transceiver (TX) interface 125, which can include components, hardware, devices, etc. configured to couple with one or more transmitters/transceivers communicatively coupled to antenna segments $105_A$ and $105_B$. TX interface 125 can selectively enable, or select, segments of the one or segments, e.g., antenna segments $105_A$ and $105_B$, etc. to transmit signals via the one or more transmitters/transceivers.

In an aspect, antenna component 120 can be configured to select a first segment of the one or more segments associated with a wireless protocol (see above). Further, antenna component 120 can be configured to select a second segment of the one or more segments associated with the wireless protocol. In one aspect, antenna component 120 can be configured to select a first segment of the one or more segments associated with a first wireless protocol, and select a second segment of the one or more segments associated with a second wireless protocol that is different from the first wireless protocol.

Figure 5:
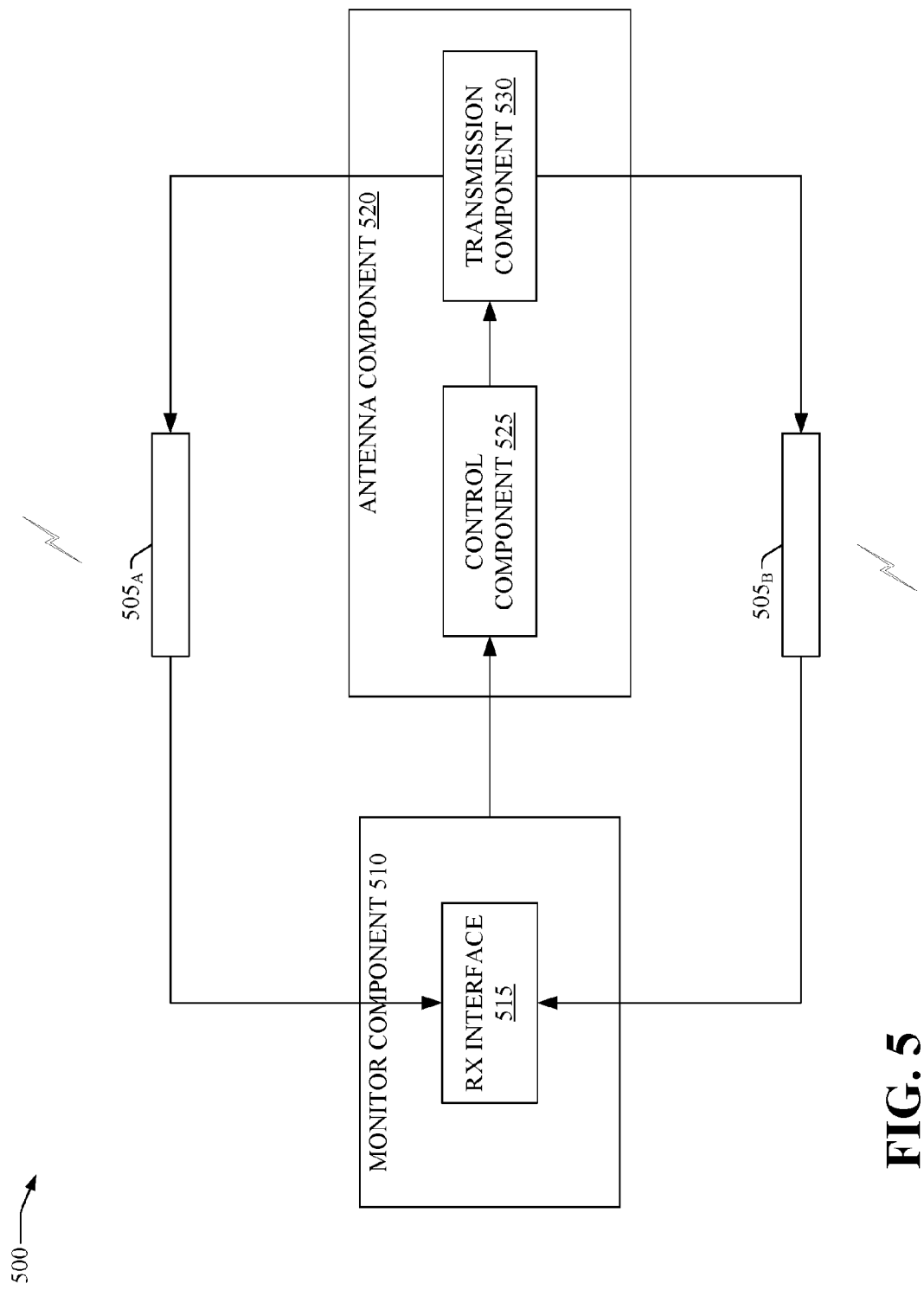
FIG. 5 illustrates yet another communications device, in accordance with an embodiment.

Now referring to FIG. 5, a communications device 500 is illustrated, in accordance with an embodiment. Communications device 500, e.g., wired device, wireless device, cellular phone, personal data assistant (PDA), mobile phone, wireless access point, picture frame, etc. can include segments $505_A$ and $505_B$ of a segmented antenna integrated with communications device 500, a monitor component 510, and an antenna component 520. Monitor component 510 can be configured to detect at least one parameter corresponding to segments $505_A$ and $505_B$, respectively. In an aspect, monitor component can include a receiver (RX) interface 515, which can include components, hardware, devices, etc. configured to determine signal strength and/or signal power associated with signals(s) detected via one or more receivers and/or transceivers (not shown) communicatively coupled to antenna segments $505_A$ and $505_B$.

Antenna component 520 can include a control component 525 configured to modify, via at least one segment of the one or more segments, e.g., antenna segments $505_A$ and $505_B$, etc. a quality of a signal according to at least one parameter detected, e.g., via monitor component 510. In an aspect, the quality of the signal can include a power of the signal, a magnitude of the signal, or a direction of propagation of the signal. For example, the direction of propagation of the signal can be modified by control component 525, e.g., via transmission component 530 described below, if transmission control component 525 selects segment(s) of the one or more segments that, e.g., face a direction, or are within a wireless coverage angle, of another device wirelessly coupled to antenna segments $505_A$, $505_B$, etc.

In an aspect, control component 525 can be communicatively coupled to a transmission component 530, which can include components, hardware, devices, etc. configured to couple with one or more transmitters/transceivers communicatively coupled to antenna segments $505_A$ and $505_B$. Transmission component 530 can selectively enable, or select, segments of the one or segments, e.g., antenna segments $505_A$ and $505_B$, etc. to transmit signals via the one or more transmitters/transceivers based on the quality modified via control component 525. In one aspect, transmission component 530 can transmit the signal, via the one or more transmitters/transceivers based on the power, the magnitude of the signal, and/or the direction of propagation of the signal.

For example, antenna component 520 can be included in a wireless access point, e.g., access point 1005 (see below), a femtocell, a Wi-Fi™ router, etc. In an aspect, if the wireless access point is located, e.g., on an upper floor of a building, control component 525 can modify, via at least one segment of the one or more segments, the direction of propagation of the signal in response to one or more other signals detected by monitor component 510. For example, if monitor component 510 detects a power level of a signal received via the at least one segment, e.g., which is located along a bottom of the wireless access point, control component 525 can select the at least one segment for wireless communication if the power level is greater than other power level(s) associated with other segments of the one or more segments. Accordingly, transmission component 530 can transmit the signal, e.g., via the one or more transmitters/transceivers, from the at least one segment, e.g., towards a device located below the wireless access point.

In another aspect, monitor component 110, 510, etc. can be further configured to detect an obstruction of a first segment of the one or more segments. Further, antenna component 120, 520, etc. can be configured to select at least one segment of the one or more segments in response to the obstruction of the first segment. In one aspect, antenna component 120, 520, etc. can (1) decrease use of the first segment, e.g., turn the first segment off, reduce power consumption associated with the first segment, not utilize the first segment in wireless communication(s), etc. and/or (2) increase use of the at least one segment, e.g., turn the at least one segment on, increase power consumption associated with the at least one segment, utilize the at least one segment in the wireless communication, etc. in response to the obstruction. In an aspect, the at least one segment can be associated with a higher level of signal recovery, or detected signal power, compared to the first segment.

In yet another aspect, antenna component 120, 520, etc. can be configured to (1) first modify, via the first segment, at least one of a first power of a first signal, a first magnitude of the first signal, or a first direction of propagation of the first signal, in response to the obstruction; and/or (2) second modify, via the at least one segment, at least one of a second power of a second signal, a second magnitude of the second signal, or a second direction of propagation of the second signal.

For example, antenna component 120, 520, etc. can reduce a transmission power of a signal transmitted via the at least one segment if the at least one segment is not obstructed, and increase a transmission power of another signal transmitted via the first segment if the at least one segment is obstructed. As such, antenna component 120, 520, etc. can optimally manage transmission power of a communications device while reducing overall exposure to electromagnetic radiation, measured as a specific absorption rate (SAR)—antenna component 120, 520, etc. can maintain a constant (or near constant) SAR while reducing the transmission power of the signal and increasing the transmission power of the other signal.

Figure 6:
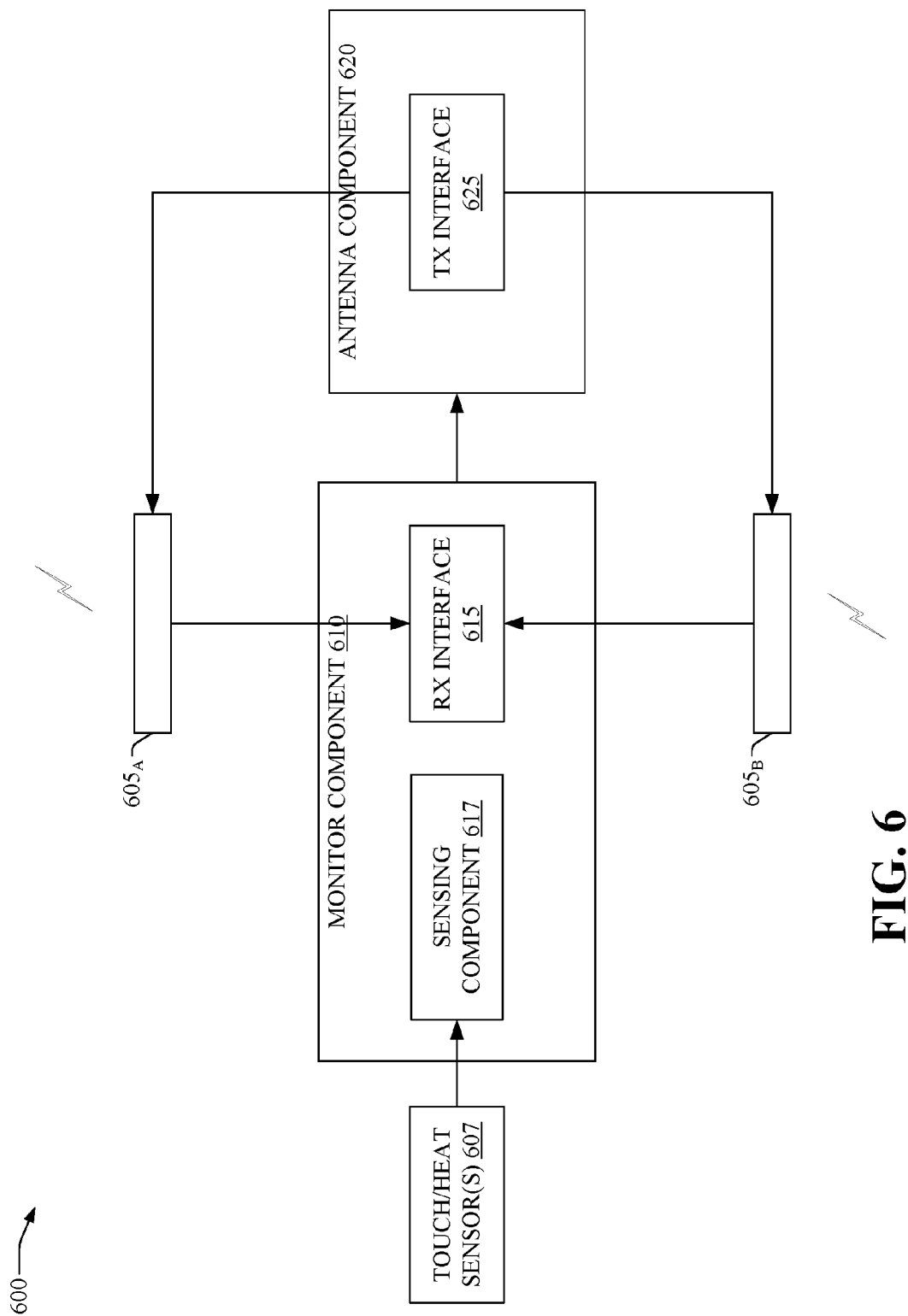
FIG. 6 illustrates a communications device including a sensing component, in accordance with an embodiment.

Referring now to FIG. 6, a communications device 600 is illustrated, in accordance with an embodiment. Communications device 600, e.g., wired device, wireless device, cellular phone, personal data assistant (PDA), mobile phone, wireless access point, picture frame, etc. can include segments $605_A$ and $605_B$ of a segmented antenna integrated with communications device 600, a monitor component 610, and an antenna component 620. Monitor component 610 can be configured to detect at least one parameter corresponding to segments $605_A$ and $605_B$, respectively, e.g., via RX interface 615, which can include components, hardware, devices, etc. configured to determine signal strength and/or signal power associated with signals(s) detected via one or more receivers and/or transceivers (not shown) communicatively coupled to antenna segments $605_A$ and $605_B$.

Further, communications device 600 can include a sensing component 617, which can be coupled to touch/heat sensor(s) 607. As such, sensing component can be configured to detect, via touch/heat sensor(s) 607, etc. the obstruction of the segment in response to at least one of: a first touch of the antenna; a second touch of an object, e.g., communications device 600, coupled to the antenna; a first source of heat applied to the antenna; or a second source of heat applied to the object. In one aspect, sensing component 617 can detect the first touch and/or the second touch via capacitive-based sensor(s), e.g., included in touch/heat sensor(s) 607. In another aspect, sensing component 617 can detect the first source of heat and/or the second source of heat via a heat flux sensor, e.g., included in touch/heat sensor(s) 607.

In an aspect, antenna component 620 can include a TX interface 625, which can include components, hardware, devices, etc. configured to couple with one or more transmitters/transceivers communicatively coupled to antenna segments $605_A$ and $605_B$. TX interface 625 can selectively enable, or select, segments of one or more segments, e.g., antenna segments $605_A$ and $605_B$, etc. to transmit signals via the one or more transmitters/transceivers, in response to the obstruction.

In one aspect (not shown), communications device 100, 300, 500, 600, etc. can include an optimization component that can be configured to periodically, e.g., once per day, once per predetermined period, once per detected movement of communications device 100, 300, 500, 600, etc. configure, e.g., select, segments of the one or more segments of the antenna of communications device 100, 300, 500, 600, etc. in response to one or more parameters detected via communications device 100, 300, 500, 600, etc. For example, in an aspect, if communications device 100, 300, 500, 600, etc. is a cell phone, the optimization component can be configured to iteratively evaluate each segment of the one or more segments of the antenna based on, e.g., a received signal strength indicator (RSSI) of an associated communication protocol. Further, the optimization component can be configured to select segment(s) of the one or more segments for wireless communication(s) via communications device 100, 300, 500, 600, etc. in response to the RSSI of signal(s) of respective segment(s) of the one or more segments.

Figure 7:
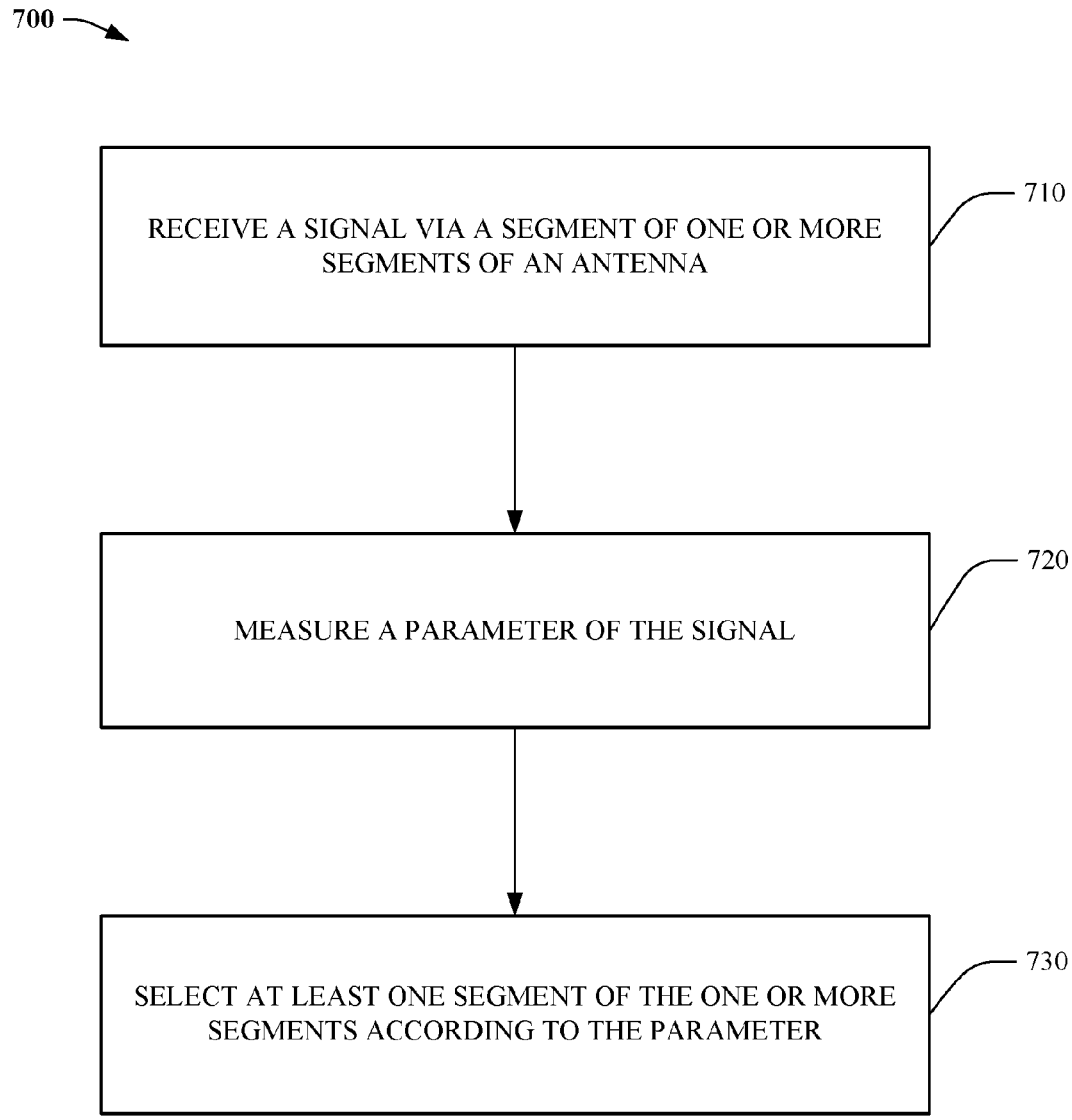
FIGS. 7-9 illustrate various processes associated with one or more configurable segmented antenna systems, in accordance with an embodiment.
Figure 8:
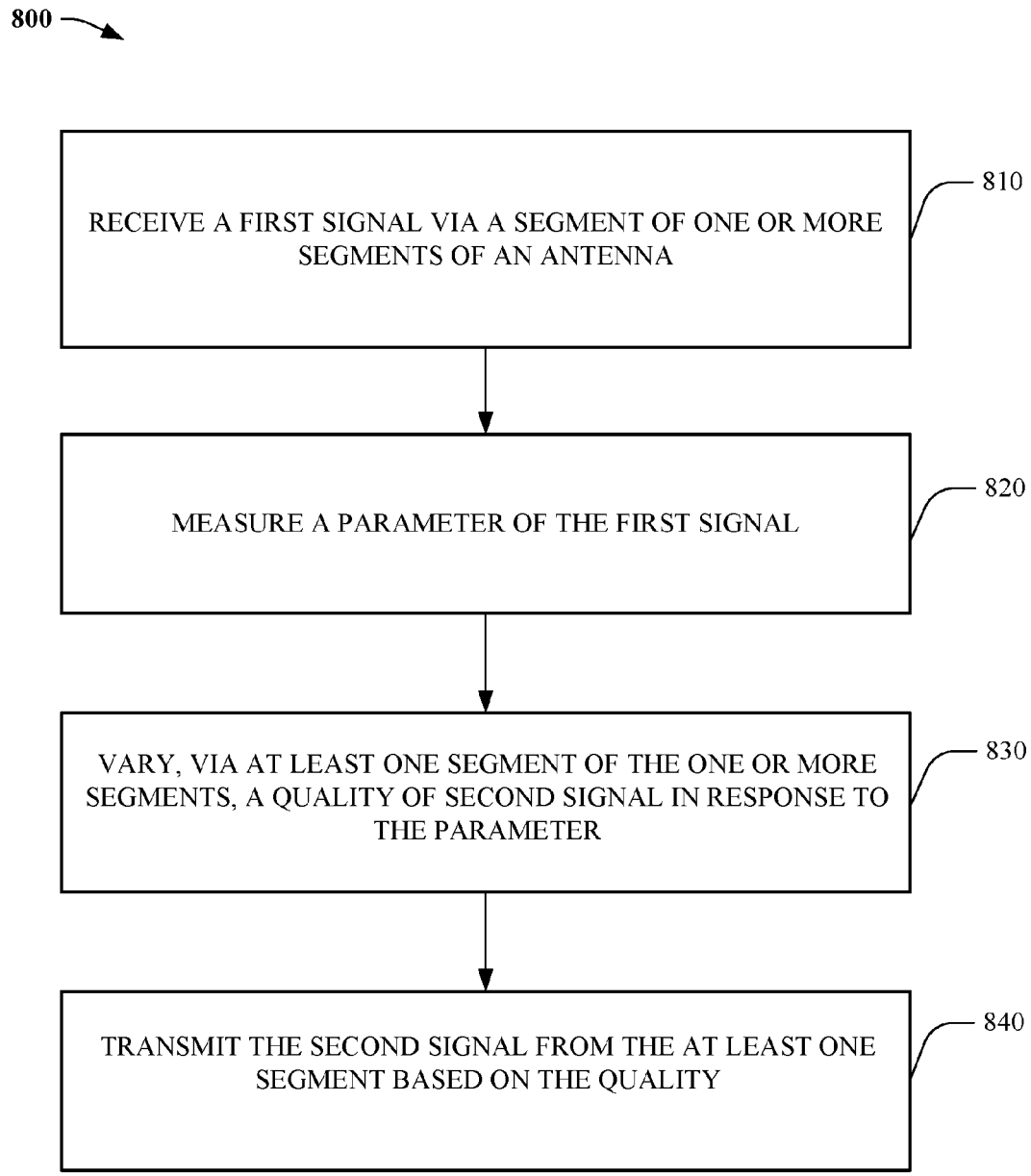
Figure 9:
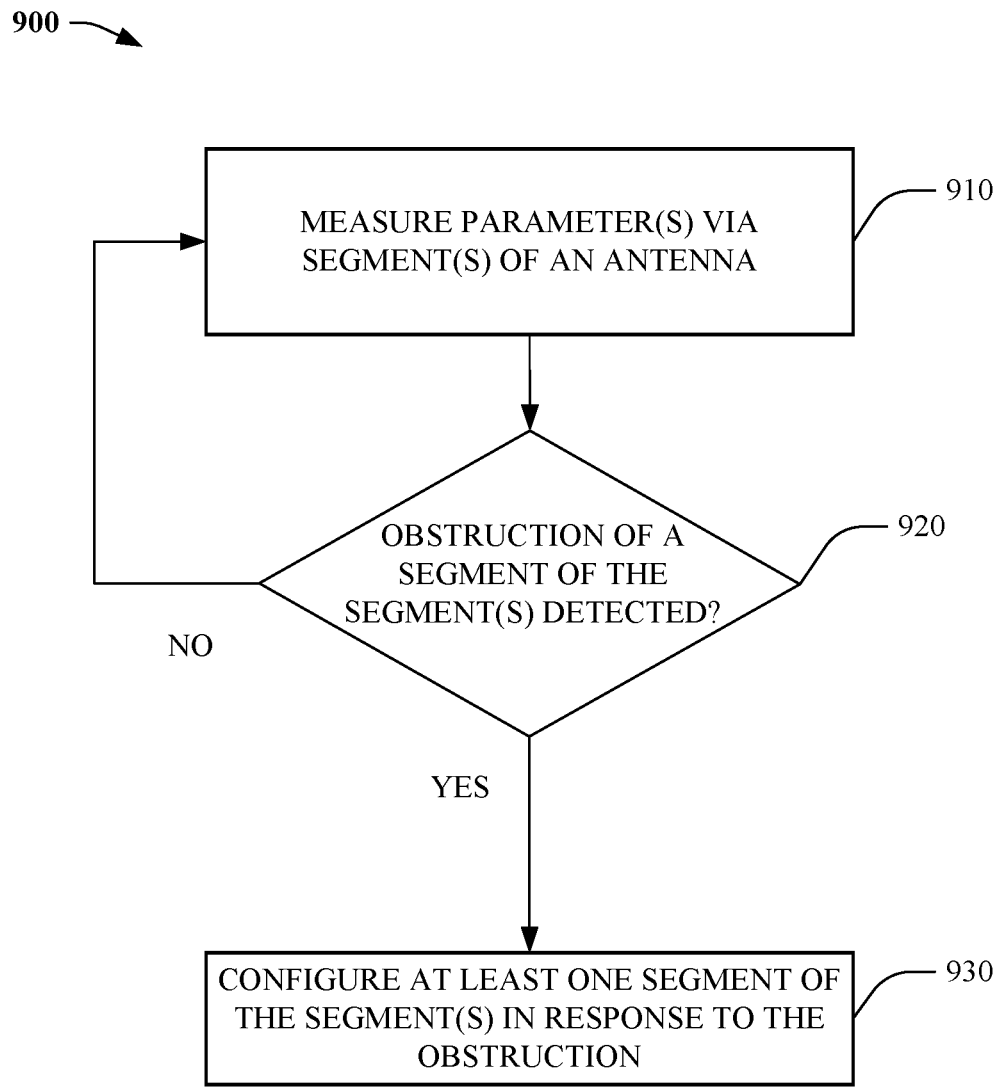

FIGS. 7-9 illustrate methods in accordance with the disclosed subject matter. For simplicity of explanation, the methods are depicted and described as a series of acts. It is to be understood and appreciated that the subject embodiments are not limited by the acts illustrated and/or by the order of acts. For example, acts can occur in various orders and/or concurrently, and with other acts not presented or described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device, carrier, or media.

Referring now to FIG. 7, a process 700 utilizing a configurable segmented antenna integrated with a communications device is illustrated, in accordance with an embodiment. At 710, a signal can be received via a segment of one or more segments of the segmented antenna, e.g., via monitor component 110, 600, etc. In an aspect, the one or more segments can be associated with a wireless protocol or different wireless protocols, such as, Wi-Fi™, WiMAX™, Bluetooth™ 3GPP, 3GPP2, LTE™, LTE™ Advanced, UMTS, GSM, NFC, Wibree, Wi-Fi Direct™, etc. At 720, a parameter of the signal can be measured, e.g., via monitor component 110, 600, etc. In an aspect, the parameter can be a power of the signal or a magnitude of the signal. At 730, at least one segment of the one or more segments can be selected, via antenna component 120, 500, etc. according to the parameter.

FIG. 8 illustrates another process (800) utilizing a configurable segmented antenna integrated with a communications device, in accordance with an embodiment. At 810, a first signal can be received, e.g., utilizing monitor component 110, 600, etc. via a segment of the segmented antenna. At 820, a parameter, e.g., power, of the first signal can be measured, e.g., via monitor component 110, 600, etc. At 830, a quality, e.g., power, magnitude, direction of propagation, etc. of a second signal can be varied, via at least one segment of the segmented antenna, in response to the parameter, e.g., utilizing control component 510, etc. At 840, the second signal can be transmitted from the at least one segment based on the quality, e.g., via transmission component 520, etc.

FIG. 9 illustrates yet another process (900) utilizing a configurable segmented antenna integrated with a communications device, in accordance with an embodiment. At 910, parameter(s), e.g., power, magnitude, etc. of signal(s) of respective segment(s) of the segmented antenna can be measured, e.g., via monitor component 110, 600, etc. At 920, monitor component 110, 600, etc. can determine whether an obstruction of the segment(s) is detected in response to the parameter(s). If the obstruction is detected, process 900 continues to 930, at which at least one segment of the segment(s) can be configured, e.g., enabled, disabled, etc. via antenna component 120, 500, etc.

Figure 10:
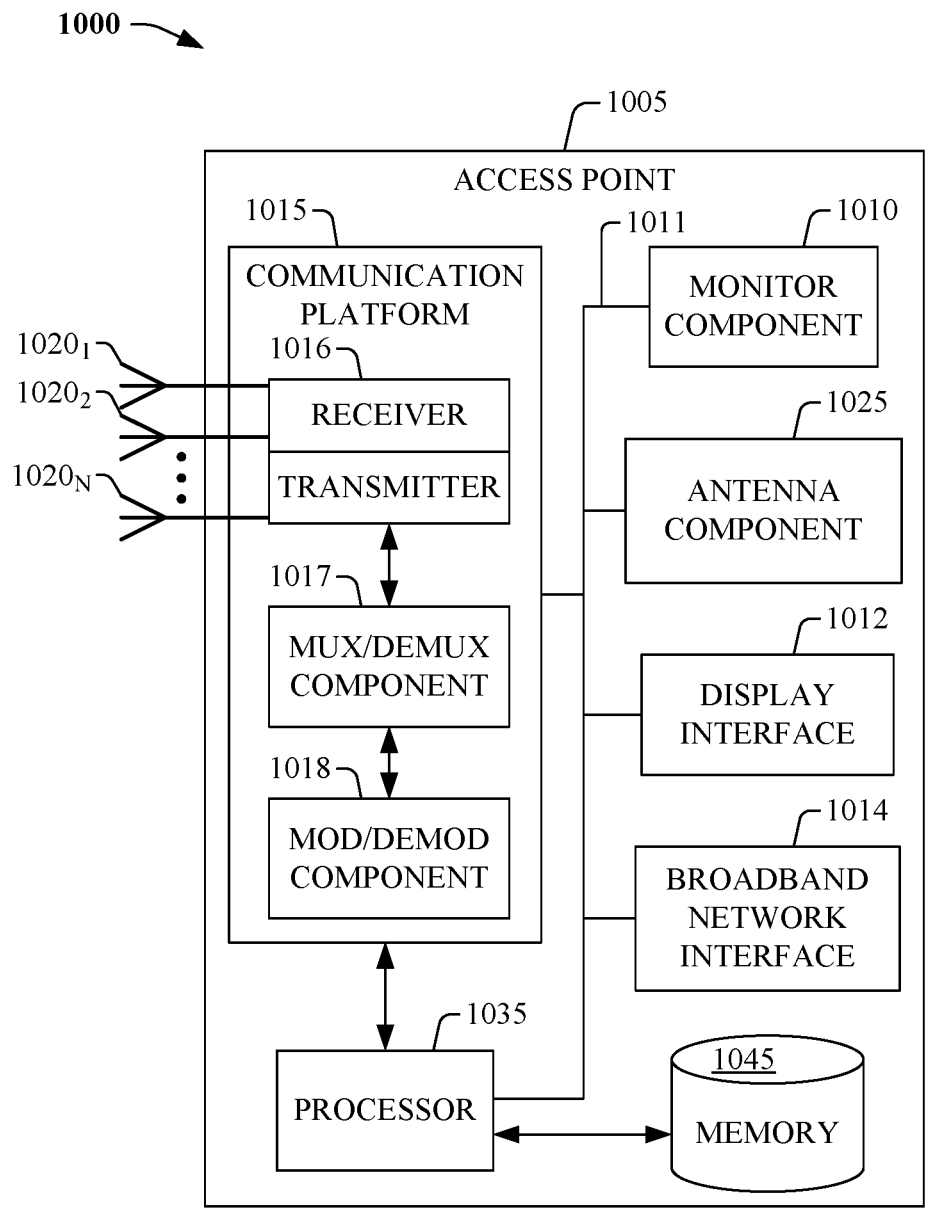
FIG. 10 illustrates a block diagram of an access point, in accordance with an embodiment.

To provide further context for various aspects of the disclosed subject matter, FIG. 10 illustrates a block diagram of an embodiment 1000 of an access point 1005, e.g., base station, wireless access point, femtocell access point, etc. that can enable and/or exploit features or aspects of the disclosed subject matter.

In embodiment 1000, access point 1005 can receive and transmit signal(s) from and to wireless devices (e.g., communications device 100, 300, 500, 600, etc.), wireless ports, wireless routers, etc. through segments $1020_1$-$1020_N$ (N is a positive integer). Segments $1020_1$-$1020_N$ can be internal and/or external to access point 1005, and can be controlled by (1) monitor component 1010, e.g., monitor component 110, 510, 610, etc. and (2) antenna component 1025, e.g., antenna component 120, 520, 620, etc. Further, monitor component 1010 and antenna component 1025 can couple to communication platform 1015, which comprises electronic components and associated circuitry that provide for processing and manipulation of received signal(s) and other signal(s) to be transmitted.

In an aspect, communication platform 1015 includes a receiver/transmitter 1016 that can convert analog signals to digital signals upon reception of the analog signals, and convert digital signals to analog signals upon transmission. In addition, receiver/transmitter 1016 can divide a single data stream into multiple, parallel data streams, or perform the reciprocal operation. Coupled to receiver/transmitter 1016 is a multiplexer/demultiplexer 1017 that facilitates manipulation of signals in time and frequency space. Electronic component 1017 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1017 can scramble and spread information, e.g., codes, according to substantially any code known in the art, e.g., Hadamard-Walsh codes, Baker codes, Kasami codes, polyphase codes, etc. A modulator/demodulator 1018 is also a part of communication platform 1015, and can modulate information according to multiple modulation techniques, such as frequency modulation, amplitude modulation, e.g., M-ary quadrature amplitude modulation (QAM), with M a positive integer); phase-shift keying (PSK); etc.

Access point 1005 also includes a processor 1035 configured to confer, at least in part, functionality to substantially any electronic component in access point 1005. In particular, processor 1035 can facilitate configuration of access point 1005 via, e.g., monitor component 1010, antenna component 1025, and one or more component therein. Additionally, access point 1005 can include display interface 1012, which can display functions that control functionality of access point 1005, or reveal operation conditions thereof. In addition, display interface 1012 can include a screen to convey information to an end user. In an aspect, display interface 1012 can be an LCD, a plasma panel, a monolithic thin-film based electrochromic display, and so on. Moreover, display interface 1012 can also include a component (e.g., speaker) that facilitates communication of aural indicia, which can also be employed in connection with messages that convey operational instructions to an end user. Display interface 1012 can also facilitate data entry e.g., through a linked keypad or via touch gestures, which can cause access point 1005 to receive external commands, e.g., restart operation.

Broadband network interface 1014 facilitates connection of access point 1005 to a service provider network (not shown) that can comprise one or more cellular technologies (e.g., 3GPP UMTS, GSM, etc.) via backhaul link(s) (not shown), which enable incoming and outgoing data flow. Broadband network interface 1014 can be internal or external to access point 1005, and can utilize display interface 1012 for end-user interaction and status information delivery.

Processor 1035 can be functionally connected to communication platform 1015 and can facilitate operations on data, e.g., symbols, bits, or chips, for multiplexing/demultiplexing, such as effecting direct and inverse fast Fourier transforms, selection of modulation rates, selection of data packet formats, inter-packet times, etc. Moreover, processor 1035 can be functionally connected, via data, system, or address bus 1011, to display interface 1012 and broadband network interface 1014, to confer, at least in part, functionality to each of such components.

In access point 1005, memory 1045 can retain location and/or coverage area, e.g., macro sector, identifier(s); access list(s) that authorize access to wireless coverage through access point 1005; sector intelligence that can include ranking of coverage areas in the wireless environment of access point 1005, radio link quality and strength associated therewith, or the like. Memory 1045 also can store data structures, code instructions and program modules, system or device information, code sequences for scrambling, spreading and pilot transmission, access point configuration, and so on. Processor 1035 can be coupled, e.g., via a memory bus, to memory 1045 in order to store and retrieve information used to operate and/or confer functionality to the components, platform, and interface that reside within access point 1005.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in memory 1045, non-volatile memory 1122 (see below), disk storage 1124 (see below), and memory storage 1146 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 11:
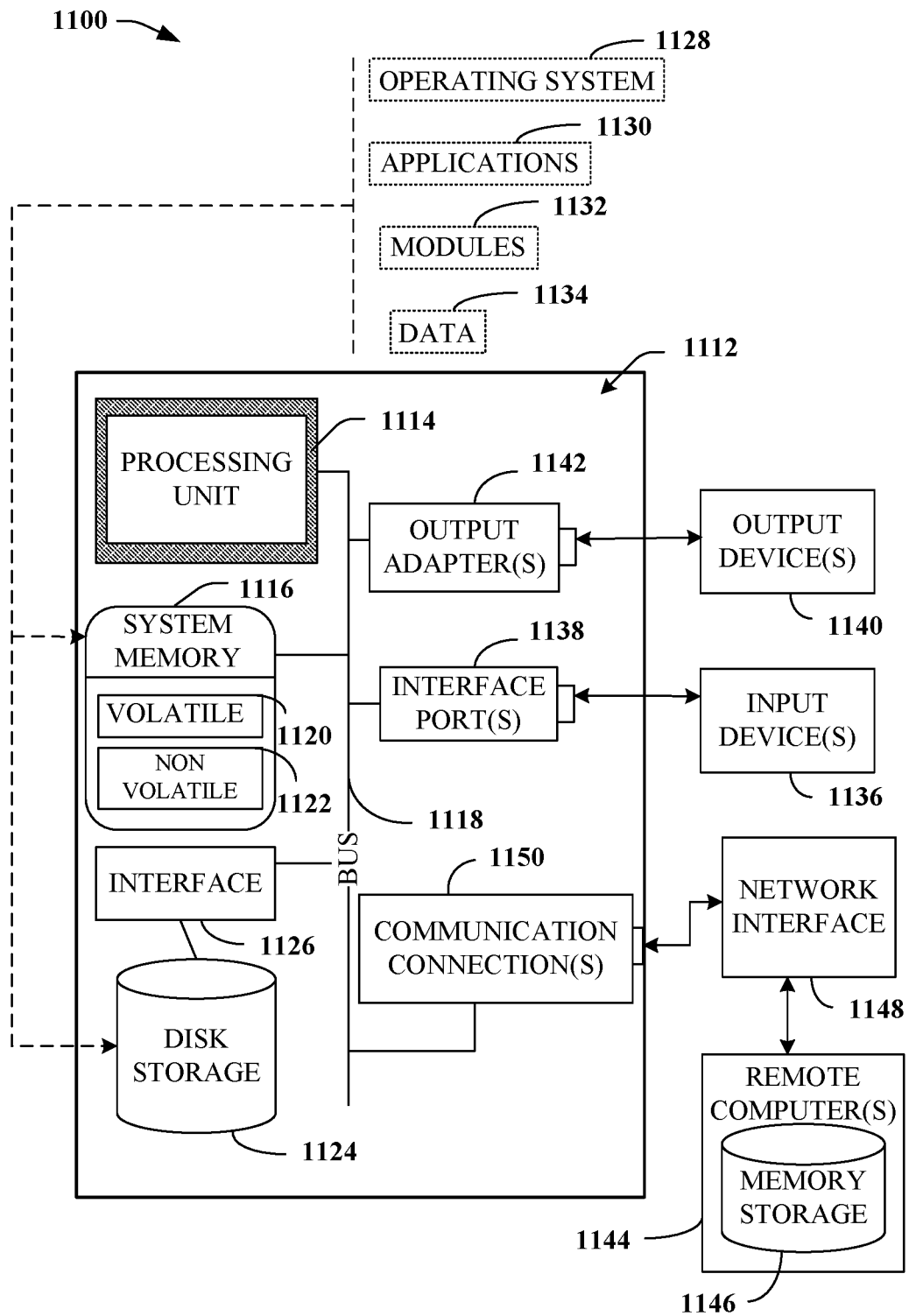
FIG. 11 illustrates a block diagram of a computing system operable to execute the disclosed methods and apparatus, in accordance with an embodiment.

In order to provide a context for the various aspects of the disclosed subject matter, FIG. 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject application also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multi-processor computer systems, mini-computing devices, mainframe computers, as well as personal computers, hand-held computing devices (e.g., PDA, phone, watch), micro-processor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 11, a block diagram of a computing system 1100 operable to execute the disclosed systems and methods is illustrated, in accordance with an embodiment. Computer 1112 includes a processing unit 1114, a system memory 1116, and a system bus 1118. System bus 1118 couples system components including, but not limited to, system memory 1116 to processing unit 1114. Processing unit 1114 can be any of various available processors. Dual microprocessors and other multiprocessor architectures also can be employed as processing unit 1114.

System bus 1118 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

System memory 1116 includes volatile memory 1120 and nonvolatile memory 1122. A basic input/output system (BIOS), containing routines to transfer information between elements within computer 1112, such as during start-up, can be stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to system bus 1118, a removable or non-removable interface is typically used, such as interface 1126.

It is to be appreciated that FIG. 11 describes software that acts as an intermediary between users and computer resources described in suitable operating environment 1100. Such software includes an operating system 1128. Operating system 1128, which can be stored on disk storage 1124, acts to control and allocate resources of computer system 1112. System applications 1130 take advantage of the management of resources by operating system 1128 through program modules 1132 and program data 1134 stored either in system memory 1116 or on disk storage 1124. It is to be appreciated that the disclosed subject matter can be implemented with various operating systems or combinations of operating systems.

A user can enter commands or information, e.g., via interface component 830, into computer 1111 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1114 through system bus 1118 via interface port(s) 1138. Interface port(s) 1138 include, for example, a serial port, a parallel port, a game port, and a universal serial bus (USB). Output device(s) 1140 use some of the same type of ports as input device(s) 1136.

Thus, for example, a USB port can be used to provide input to computer 1112 and to output information from computer 1112 to an output device 1140. Output adapter 1142 is provided to illustrate that there are some output devices 1140 like monitors, speakers, and printers, among other output devices 1140, which use special adapters. Output adapters 1142 include, by way of illustration and not limitation, video and sound cards that provide means of connection between output device 1140 and system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. Remote computer(s) 1144 can be a personal computer, a server, a router, a network PC, a workstation, a microprocessor based appliance, a peer device, or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refer(s) to hardware/software employed to connect network interface 1148 to bus 1118. While communication connection 1150 is shown for illustrative clarity inside computer 1112, it can also be external to computer 1112. The hardware/software for connection to network interface 1148 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
    determining, by a system comprising a processor, a direction of propagation of a signal that has been transmitted from a first segment of segments of an antenna, wherein the first segment facilitates first transmissions according to a first wireless protocol, and wherein a second segment of the segments facilitates second transmissions according to a second wireless protocol that is different from the first wireless protocol; and
    in response to determining that the first segment has been obstructed by an object, modifying, by the system, the direction of propagation of the signal.

2. The method of claim 1, wherein the segments of the antenna are arranged in overlapping strips.

3. The method of claim 1, further comprising:
    determining, by the system, a power of the signal; and
    selecting, by the system, the first segment according to the power of the signal.

4. The method of claim 1, wherein the determining that the first segment has been obstructed by the object further comprises varying, by the system, the power of the signal.

5. The method of claim 1, wherein the signal is a first signal, and further comprising:
    based on the second wireless protocol, transmitting, by the system, a second signal using the second segment.

6. The method of claim 1, wherein the determining that the first segment has been obstructed by the object comprises detecting the antenna has been touched by the object.

7. The method of claim 1, wherein the first segment is included on an outer surface of an enclosure of the system.

8. An apparatus, comprising:
    a processor; and
    a memory that stores executable instructions that, when executed by the processor, facilitate performance of operations, comprising:

determining a direction of propagation of a signal, which was transmitted from a first segment of a group of segments of an antenna of the apparatus; and in response to detecting an obstruction of the first segment by an object, modifying the direction of propagation of the signal, wherein the first segment is associated with a first wireless protocol, and wherein a second segment of the group of segments is associated with a second wireless protocol different from the first wireless protocol.

9. The apparatus of claim 8, wherein the group of segments is arranged in overlapping strips.

10. The apparatus of claim 8, wherein the detecting the obstruction comprises detecting the obstruction of the first segment using a heat sensor of the apparatus.

11. The apparatus of claim 8, wherein the operations further comprise:

transmitting a first wireless signal from the first segment according to the first wireless protocol; and transmitting a second wireless signal from the second segment according to the second wireless protocol.

12. The apparatus of claim 8, wherein the operations further comprise:

transmitting the signal using the first segment.

13. The apparatus of claim 8, wherein the operations further comprise:

modifying a power of the signal.

14. The apparatus of claim 13, wherein the modifying the power of the signal comprises:

in response to the detecting of the obstruction of the first segment by the object, performing the modifying of the power of the signal.

15. The apparatus of claim 8, wherein the detecting the obstruction comprises detecting the antenna has been touched by the object.

16. The apparatus of claim 8, wherein the first segment is on an external surface of the apparatus.

17. A system, comprising:

an antenna comprising antenna segments;

a processor; and a memory that stores executable instructions that, when executed by the processor, facilitate performance of operations, comprising:

determining a direction of propagation of a signal from a first segment of the antenna segments; and in response to determining that the first segment has been at least partially covered by an object, modifying the direction of the propagation of the signal from the first segment, wherein the first segment corresponds to a first wireless protocol, and wherein a second segment of the antenna segments corresponds to a second wireless protocol distinct from the first wireless protocol.

18. The system of claim 17, wherein the antenna segments have been arranged in overlapping strips.

19. The system of claim 17, wherein the operations further comprise:

in response to determining that the first segment has been at least partially covered by the object, increasing a power of the signal resulting in an increased power, and transmitting the signal via the first segment according to the increased power.

20. The system of claim 17, wherein the determining that the first segment has been at least partially covered by the object comprises detecting, based on an output of a heat sensor, that the antenna has been contacted by the object.

* * * * *